Figure 3:
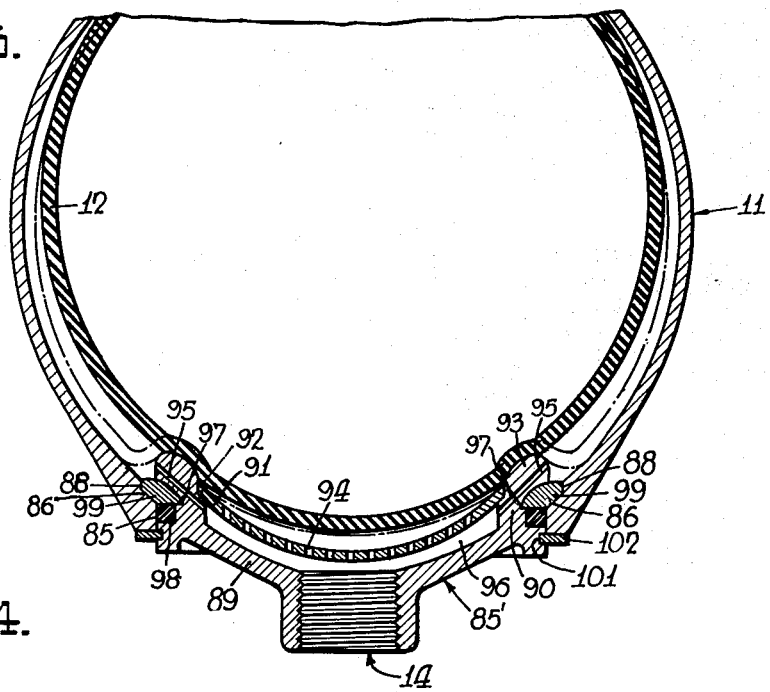

March 10, 1953  I. E. WEBER ET AL  2,630,834
PRESSURE ACCUMULATOR
Filed March 30, 1948                     2 SHEETS—SHEET 1
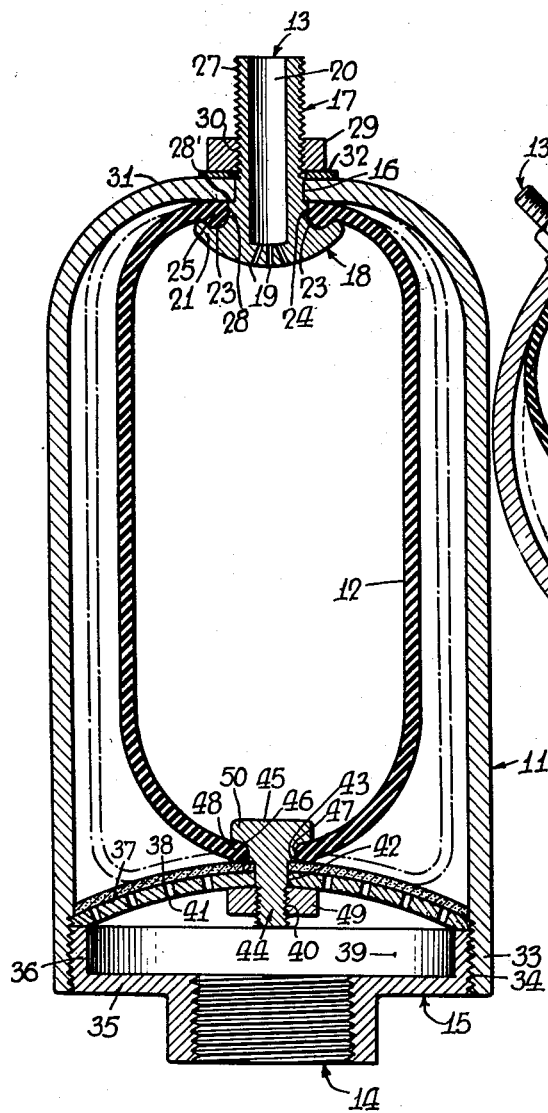
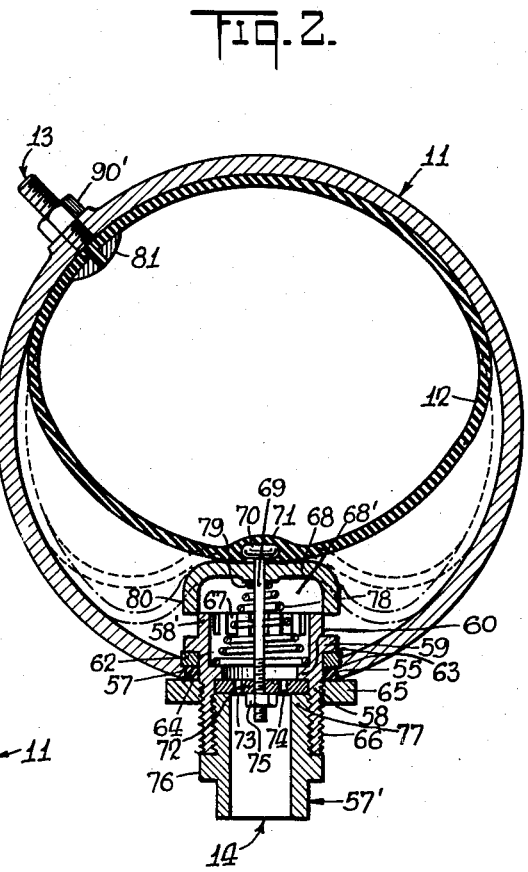
INVENTORS:
Isaac E. Weber
Joseph Blumenfeld
BY
Dean Fairbank & Hirsch
ATTORNEYS.

March 10, 1953 I. E. WEBER ET AL 2,630,834
PRESSURE ACCUMULATOR
Filed March 30, 1948 2 SHEETS—SHEET 2

INVENTORS.
Isaac E. Weber
Joseph Blumenfeld
BY
Dean Fairbank & Hirsch
ATTORNEYS.

Patented Mar. 10, 1953

2,630,834

UNITED STATES PATENT OFFICE 2,630,834

PRESSURE ACCUMULATOR

Isaac E. Weber, New Rochelle, and Joseph Blumenfeld, New York, N. Y.; said Weber assignor to said Blumenfeld, assignor, by direct and mesne assignments, to Simone Mercier, New York, N. Y.

Application March 30, 1948, Serial No. 17,864

4 Claims. (Cl. 138—30)

This invention relates to pressure accumulators of the type that comprises a container to be filled with a fluid usually a liquid, and a collapsible and expansible rubber bag in the container, filled with a buffer fluid, preferably air under pressure.

This application is a continuation in part of our co-pending application Serial Number 519,782 filed January 26, 1944, now Patent No. 2,550,892.

As it is generally required that the liquid to be expelled from the container of the accumulator be available under very high pressure, the rubber bag must necessarily initially be filled with a gas under a high pressure which may be of the order of 1500 pounds per square inch.

When liquid is pumped into the container (as for instance by means of a piston pump), the enclosed inflated rubber bag will be compressed and collapsed and the pressure per unit of area of the gas inside the bag will equal that of the liquid compressed in the container. By means of a suitable valve on the container outlet, the latter can be opened, thereby enabling the rubber bag to expand and force liquid from the container under progressively decreasing pressure, to flow, for example, to a hydraulic system such as a motor vehicle brake.

Where the flexible rubber bag in expanding with the expulsion of liquid from the container is forced against the outlet, the highly compressed gas in the rubber bag is likely to cause the wall thereof to extrude from such outlet and block discharge therefrom, as well as pinching the wall of the bag with possible tearing thereof, or other damage thereto. When very high pressures are used, which is common in devices of this type, such damage is likely to occur even if the outlet or port is of very small diameter.

Where a large rate of flow of the liquid is to be effected, as is desirable in some applications of pressure accumulators, unless the outlet or port remains open until substantially all the liquid in the container is expelled, the trapped liquid will not be available for useful purposes. Also where the rubber bag, when expanding collects liquid in pockets between the outer wall of the bag and the inner wall of the container the entire available supply of liquid cannot be utilized and to the extent of this trapping of liquid the device is not efficient and a correspondingly larger container would have to be used for a given job.

It is accordingly among the objects of this invention to provide a pressure accumulator of the above type, that is simple and rugged in construction, relatively light in weight and efficient in operation, that can operate at very high pressure without danger of tearing or other injury to the expansible bag therein, and that will preclude material trapping and permit substantially complete expulsion of the liquid therefrom.

According to the invention the device comprises a spherical or cylindro-spherical container in which a collapsible and expansible rubber bag is housed which in distended but substantially unstretched condition is smaller than the cavity of the container.

The outlet or port is preferably provided with an upstanding member spacing the bag from said outlet and against which the rubber bag will react after the container has been exhausted to the extent to permit the wall of the rubber bag to stretch and the inflated bag therefore to stiffen, to press against the wall of the container opposed to said upstanding member.

Further expansion of the stretched and stiffened bag in discharge of liquid from the container will result in higher reaction pressure against the wall area of said container opposed to said upstanding member than against the intervening wall areas of said container. Thus as the inflated bag continues to expand and stiffen, the liquid in the container will be progressively forced from between the bag and the wall area opposed to the upstanding member.

Figure 4:
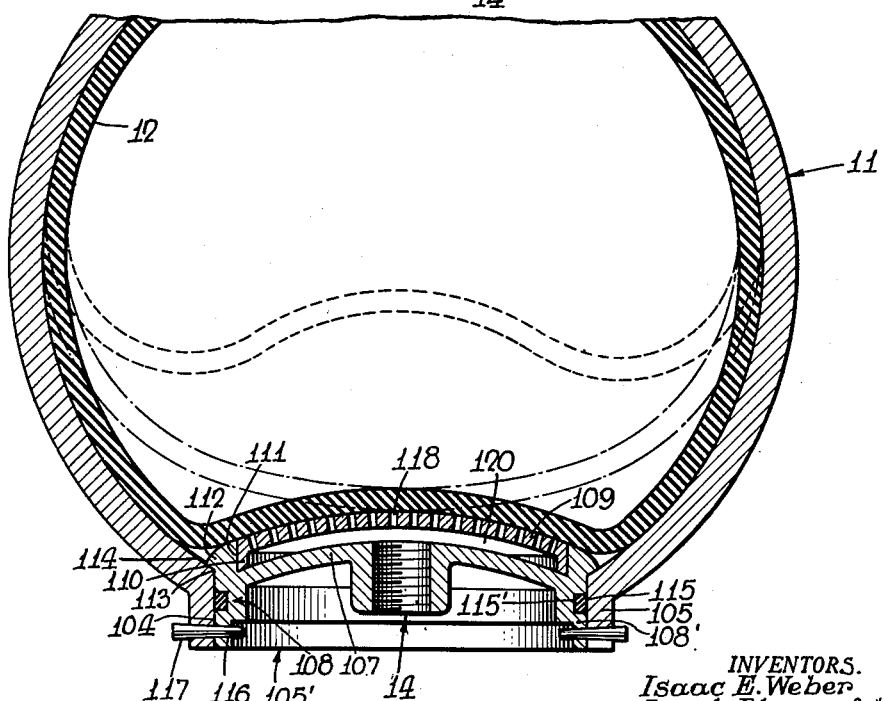

In the accompanying drawings in which are shown one or more of the various possible embodiments of the several features of this invention, Fig. 1 is a view in longitudinal cross section of one embodiment of the device, Fig. 2 is a view similar to Fig. 1 of another embodiment of the device, Fig. 3 is a fragmentary view otherwise similar to Fig. 1 of another embodiment of the device, and Fig. 4 is a view similar to Fig. 3 of still another embodiment.

Referring now to the drawings the pressure accumulator in all embodiments herein, comprises a container or pressure chamber 11 preferably of strong, rigid material such as steel, cast aluminum or the like, capable of withstanding high pressure. The container may be spherical or cylindro-spherical as desired and has a collapsible and expansible bag 12 therein which preferably is of resilient material such as rubber or synthetic plastic of like physical characteristics, and which is distended but substantially unstretched condition is smaller than the cavity of the container. The container 11 has an inlet 13 leading into the rubber bag 12 and an outlet or port 14 providing access to the container.

Referring specifically to Fig. 1 the upper end of container 11 has an inlet opening 16 therein through which a hollow inlet member 17 is inserted. Member 17 has a convex head 18 at the inner end thereof with openings 19 therethrough leading into the bore 20 of member 17. Rim 21 of head 18 and the adjacent portion of member 17 present a peripheral depression 23, which, when the head 18 of the inlet member 17 is forced into the opening 24 at the top of the rubber bag 12, engages the beaded rim 25 of said opening.

Inlet member 17 has a reduced neck 27 forming a shoulder or stop 28 which prevents rim 21 from cutting the rubber bag and injuring the same. This might occur if the nut 29 secured by a lock washer 32, and which coacts with the threaded portion 30 of the reduced neck 27 to clamp the beaded rim 25 of rubber bag 12 between rim 21 and top wall 31 of the container, should be tightened excessively.

The bottom end 33 of the container 11 has a closure plug 15 removably affixed thereto by means of the coacting screw threads 34. Plug 15 comprises a bottom plate 35 having internally threaded outlet or port 14 therein, an upstanding rim 36 at the periphery of the bottom plate and integral therewith and an upstanding member comprising a convex cover plate 37 seated on the rim 36 and rigid therewith, the bottom plate and the cover plate defining a liquid receiving and holding space 39 therebetween. In the embodiment herein shown a convex cap 38 of porous material, such as porous bronze, the concavity of which conforms to the convexity of cover plate 37, is preferably affixed to the latter at the edge thereof, the cover plate serving to provide support for the porous cap. However, it is to be understood that the cap 38 could be affixed directly to the rim 36 of the plug or the device could be used with only the convex cover plate 37.

Cover plate 37 has a plurality of passageways 41 therethrough preferably disposed from the center to the edge thereof, and an opening 42 is provided at the center of the convex cap 38 and the cover plate 37 into which a bolt 44 is inserted. The rim 50 of head 45 of bolt 44 and the body of said bolt adjacent said head present a peripheral depression 46, which, when the head of the bolt is inserted into opening 47 at the bottom of the rubber bag 12 will engage the beaded rim 48 of said opening. The bolt has a reduced nose 40 forming a shoulder or stop 43 which engages the convex face of cap 38 about opening 42 therein so that when nut 49 is threaded on the end of bolt 44 which extends into space 39, the beaded rim 48 of opening 47 will be firmly clamped between the rim 50 of head 45 and porous cap 38 without danger of injury to the rim 48 in the event of excessive tightening of nut 49.

To assemble the device shown in Fig. 1, the head 18 of member 17 is inserted into the opening 24 in rubber bag 12 so that the annular depression 23 in the rim 21 and the wall of the inlet member 17 engage the beaded rim 25. The neck 27 of member 17 is then inserted into the inlet opening 16 in the container so that the shoulder or stop 28 of the inlet member 17 rests against the inner wall of the container as at 28' and the threaded end 30 of the inlet member 17 extends from the top of the container.

Nut 29 is threaded around said neck and secured by washer 32, rigidly to clamp the beaded rim 25 of the rubber bag between rim 21 of the convex head 18 of the inlet member and the wall of the container. The head 45 of bolt 44 is inserted into the opening 47 at the end of rubber bag 12 so that annular depression 46 engages the beaded rim 48. Closure plug 15 is then threaded into the open end of the container 11 with bolt 44 passing through the openings 42 in the convex cap 38 and the cover plate 37. The outlet 14 in the closure plug 15 is of sufficient size so that convenient access is afforded to enable nut 49 to be screwed on the threaded end 40 of bolt 44 to complete the assembly.

In the embodiment of Fig. 2 a closure plug or outlet closing valve assembly 57' is affixed in an opening 55 at the bottom of the container. The assembly 57' comprises a tubular member 58 having an external peripheral flange 59 near the upper end thereof and an internal peripheral flange 60. The upper rim 58' of the tubular member 58 is serrated to provide passageways 67 from the container to the outlet 14. A snap ring 62 encompasses said tubular member 58 and is seated on a ledge or shoulder 57 about the opening 55, the peripheral flange 59 of the tubular member 58 resting on said snap ring 62 as at 63. Encompassing said tubular member 58 and in juxtaposition with the opening in the container is a rubber gasket 64 which serves effectively to prevent leakage between opening 55 in the container and the wall of member 58 when a nut 65 is screwed on the externally threaded lower end 66 of tubular member 58.

An upstanding member comprising a displaceable substantially cup shaped cover plate or valve cup 68 with an inner diameter slightly greater than the outer diameter of the rim 58' of the tubular member 58 is mounted above the latter by means of a bolt 69 extending through the center of said cover plate 68 and rigidly affixed therein. The upper end of the bolt has a head 70 which may be affixed as at 71 into the bottom of rubber bag 12 as by vulcanizing thereinto. The lower end of the bolt passes through the hub 72 of a disc 73 having a plurality of openings 74 therethrough, smaller in size than the passageways 67 in rim 58', for the reason hereinafter set forth, and is retained in said hub 72 by a nut 75 threaded on the end of the bolt. The upper end 77 of a coupling member 76, threaded into tubular member 58 retains said disc 73 therein by pressing the latter against the lower face of internal flange 60. A coil spring 78 is seated on the upper face of flange 60 and presses against the underside of the cover plate or valve cup 68 as at 79 thereby normally to retain the rim 80 of the cover plate above the passageways 67 in the rim 58' of the tubular member 58 thus maintaining the valve assembly 57' and consequently the outlet or port 14 in open position.

In this embodiment, inlet 13 is shown as an air valve, which is affixed to the rubber bag 12 as at 81 in the manner of the conventional bicycle tire valve, and hence will not be described in detail. However, it is to be understood that the inlet shown in Fig. 1 could be used in place of this bicycle type valve.

To assemble the device shown in Fig. 2 the rubber bag 12 with bolt 69 and cover plate 68 affixed thereto, is first inserted through the opening 55 in the container 11 and the air inlet 13 thereof is affixed to the wall of the container by nut 90'.

Tubular member 58 with coil spring 78 seated on flange 60 is then inserted into opening 55 with the upper end of spring 78 against the underside of cover plate 68 as at 79 and snap ring 62 is placed around member 58 beneath flange 59. The tubular member 58 and snap ring 62 are then positioned so that the snap ring 62 becomes seated upon the ledge 57. Nut 65 is then screwed on the threaded portion 66 securely to clamp the tubular member 58 in opening 55. The threaded end of bolt 69 is then passed through the hub 72 of disc 73 and nut 75 is screwed thereon, so that rim 80 of the cover plate 68 will be in line with the top of rim 58' of the tubular member 58 as shown in Fig. 2, the tension of coil spring 78 retaining the cover plate 68 in valve open position. Coupling member 76 is then threaded into tubular member 58, the upper rim 77 of the coupling member clamping the disc against the lower face of flange 60.

In the embodiments shown in Figs. 3 and 4 no inlet is shown. However, it is to be understood that either of the inlets shown in Figs. 1 or 2 could be used.

In Fig. 3 the spherical container 11 has an opening 85 at the bottom thereof in which a closure plug 85' is removably affixed. The closure plug 85' comprises a bottom plate 89 having an internally threaded outlet or port 14 therein, an upstanding rim 90 at the periphery of the bottom plate and unitary therewith and a concave cover plate 91 seated on an annular shoulder 92 in the inner wall of said rim and rigidly affixed thereto. A portion of rim 90 extends above said cover plate to form an upstanding member or flange 93 which will be more fully described hereinafter.

A plurality of passageways 94 are provided in cover plate 91 preferably disposed from the center to the edge thereof, and a plurality of laterally radiating ports 95 extend through said rim 90 from the interior of the container to the liquid receiving and holding space 96 between the bottom plate 89 and the cover plate 91.

Closure plug 85' has a peripheral groove 97 therein beneath ports 95 and a rubber gasket 98 preferably affixed to said rim beneath said groove. A snap ring 99 is seated on the beveled edge 86 of opening 85 of the container against shoulder 88 thereof, and in groove 97 in the rim 90 of the plug. A peripheral slot 101 is provided at the end of rim 90 below bottom plate 89, extending outside the container to accommodate a snap ring 102, thus securely to retain the closure plug in the container.

In the assembly of the device shown in Fig. 3, the rubber bag 12 is first inserted through the opening 85. Closure plug 85' is then inserted into opening 85 and snap ring 99 is fitted into peripheral groove 97 in the rim of the closure plug and then seated on the beveled portion 86 against shoulder 88. Snap ring 102 is then inserted into peripheral slot 101 securely to retain the closure plug in place.

In Fig. 4 the container 11 has an opening 104 at the bottom thereof with a rim or neck 105 extending outwardly therefrom.

A closure plug 105' fitted in opening 104 comprises a bottom plate 107 having an internally threaded outlet or port 14 therein and a rim 108 on the periphery of the bottom plate extending both above and below the latter and unitary therewith. An upstanding member, comprising a convex cover plate 109 having a plurality of passageways 118 therethrough, disposed from the center to the edge thereof and having a downwardly depending rim 110, is seated on the bottom plate and rigidly affixed thereto as at 111. The upper portion 112 of rim 108 along the outer periphery thereof, is beveled as at 113 to coact with the curved inner wall 114 of the container, and, as the closure plug 105' in this embodiment is introduced inside the container 11 before spinning the neck 105 thereof, plug 105' is thus permanently retained in said container yet movable therein. A rubber gasket 115 is affixed around the bottom portion 108' of rim 108 in a peripheral groove 115' to provide a seal between the neck of the container and the closure plug. To retain the closure plug 105' securely in the neck of the container a plurality of lateral openings 116 are provided in said neck and in the bottom portion 108' of rim 108 and into each pair of associated openings a pin 117 may be inserted.

In assembling the device shown in Fig. 4, as the closure plug 105' is already in the opening 104 in the container, it is merely necessary to push the plug inside the container and then insert rubber bag 12 through opening 104. The plug 105' is then seated on the rim of the opening and pins 117 are inserted into openings 116 in the neck 105 and bottom portion 108' to retain the plug in place.

*Operation*

To use any of the devices shown and described herein a fluid, preferably air, is forced under pressure into the inlet 13 leading into the rubber bag 12 until the desired pressure, which may be of the order of 1500 pounds per square inch or more, is attained. This will cause the rubber bag 12 to stretch and snugly engage the inner wall of the container. The inlet is then sealed by any suitable valve (not shown). A liquid, preferably an oil, is then forced under pressure into outlet or port 14 of the container to fill the latter.

The liquid compresses the gas in the rubber bag thus decreasing its volume, and as the liquid is generally forced into the container until a very high pressure is obtained, illustratively of the order of 5000 pounds per square inch, then and under such conditions the rubber bag is collapsed.

As the accumulator approaches exhaustion of liquid and the rubber bag becomes stretched and stiff, its reaction against the upstanding member protruding inside the container and which in Figs. 1, 2, 3 and 4 comprises porous cap 38, cover plate or valve cap 68, flange 93 and cover plate 109 respectively, will force the bag against the pole of the container substantially opposite the upstanding member. The further expansion of the stretched and stiffened bag during continued discharge of liquid from the container will result in a higher reaction pressure of the bag against the wall area of the container opposed to said upstanding member than against the intervening wall areas of the container.

Thus, during such expansion of the rubber bag with the expulsion of liquid from the container, as the pressure of the bag against the wall of the container becomes progressively less toward the outlet, if any liquid should remain between the rubber bag and the container wall it would tend to be squeezed from the area of maximum pressure to the area of lesser pressure. This would prevent any liquid from being trapped between the wall of the container and the rubber bag.

With this general principle of operation set forth, which is common to all the embodiments herein, the specific operation of each of the embodiments is as follows:

As shown in Fig. 1 the liquid when initially forced into the container will pass through openings 41 in convex plate 37 and ooze through porous cap 38, while as shown in Figs. 3 and 4 the liquid will pass through the openings in the cover plates 91 and 109 to fill the container.

In the embodiment shown in Fig. 2 the liquid when forced into the port 14 will pass through openings 74 in disc 73 and press against the inner side of cover plate 68 and force the latter upwardly against the tension of the expanded rubber bag so that the openings 67 in the rim 58' of tubular member 58 are no longer covered by the rim 80 of cover plate 68 thus enabling the liquid to fill the container. By means of a suitable valve (not shown) provided at the outlet the liquid is retained in the container.

To use the devices the outlets 14 thereof are connected to, for example, a hydraulic brake (not shown). When the outlets are opened, the pressure of the compressed gas in the rubber bag will force the incompressible liquid out of the containers.

It is to be noted that in Figs. 1 and 4, as the rubber bag 12 expands it will first close the openings 41 and 118 respectively in the curved cover plates at the center of the latter and then progressively close said openings radially outward until they all have been closed. This is clearly shown by reference to the dot and dash position of the rubber bag. This is prevented the sealing of the outlet or port while there is still any considerable amount of liquid in the container. The porous cap shown in Fig. 1 is especially useful where high pressures are involved for in such cases if not for the porous cap no matter how small the openings in the curved cover plate 37 might be, the expanding gas in the rubber bag would cause the wall thereof to extrude from such openings thereby cutting such bag and also sealing the outlet.

In the embodiment shown in Fig. 2, when the rubber bag is initially filled with gas under pressure, the expanded and stiffened bag will press upon the entire surface of member 68 and force it against the tension of spring 78 to seat the rim 80 against flange 59 to restrict the openings 67.

With the container 11 filled with liquid and the outlet 14 sealed, the pressure in the container proper and in the space 68' between cover plate or valve cup 68 and the disc 73 will be equal, and as the rubber bag 12 has been collapsed and is no longer stiff, it does not press against the valve cup 68 and the coil spring 78 will retain the rim 80 of the valve cup 68 spaced from flange 59.

When the port or outlet 14 is opened to enable liquid to be expelled, the rubber bag 12 will expand to the position shown in dashes in Fig. 2. As the openings 74 in disc 73 are relatively small compared to the openings 67 in rim 58', the pressure will remain substantially the same inside the container proper and in space 68', being slightly smaller in space 68'. The valve cup 68 would normally tend to move towards its seat on flange 59 to close openings 67 in the manner of the conventional dash-pot due to this slight differential of pressure, as the liquid is forced through openings 74 and out of the outlet. However, the tension of coil spring 78 is sufficient to overcome this slight difference in pressure and retain the valve cup 68 spaced from flange 59.

As the rubber bag continues to expand with the expulsion of more liquid from the container to the position shown in dot and dash lines in Fig. 2, the now relatively stiff bag will press against the valve cup 68' as can be seen in Fig. 2. This pressure will occur when substantially all the liquid has been expelled from the container and will overcome the tension of the coil spring and seat the rim 80 of the valve cup on flange 59 to close the valve and restrict the outlet to permit the bag to encompass it without extrusion.

It is to be noted that the distance between rim 80 of the valve cup 68 and flange 59 is such that the bag when expanding cannot reach openings 67 without first exerting sufficient pressure to seat the valve cup. This prevents extrusion of the wall of the rubber bag from the openings 67 with resultant injury thereto.

The embodiment shown in Fig. 2 is especially desirable where a large liquid flow is required, for whereas the porous cap 37 and apertures 41 in the cover plate 37 do prevent injury to the rubber bag, they restrict the flow to a far greater extent than do the openings 67 and 74.

The use of a disc 73 with openings 74 therein, smaller than the openings 67 in rim 58', though it somewhat diminishes the rate of flow, is necessitated by the fact that if no such disc was used, the rate of flow through the outlet would be so great that the pressure in space 68' would rapidly fall causing a pressure differential between the container proper and space 68' sufficient to overcome the tension of coil spring 78, thereby causing the valve cup 68 to be seated on flange 59 before all the available liquid was expelled from the container. Once this has occurred, openings 67 will remain closed until the valve cup 68 is displaced from its seat on flange 59 by the forcing of more liquid into the container.

In the embodiment shown in Fig. 3, the liquid in the container will escape therefrom through openings 94 in cover plate 91 and lateral ports 95 into space 96 and thence through outlet 14.

When the rubber bag expands to the position shown in solid lines in Fig. 3 it contacts flange 93 of closure plug 85' and cuts off openings 94 from communication with the container. However, lateral ports 95 will still remain open. Further expansion of the rubber bag to the position shown in dot and dash lines in Fig. 3 will force any liquid remaining on the plate 91 through the openings 94 therein and also seal the ports 95. With this construction substantially all the space in the container is utilized and all the available liquid therein is forced out.

As a result of the constructions herein described a pressure accumulator is available which will be efficient in operation, relatively small in size, utilizing substantially all the available liquid therein for the purpose required and without danger of injury to the rubber bag or of inavailability of liquid under pressure when needed.

While the invention finds an important field of use in hydraulic power systems such as brakes, in which an incompressible liquid is stored under gas pressure, it is of wider utility in arrangements in which a compressible gas is thus stored, and also has utility in systems in which a liquid is introduced in the previously non-inflated bag for the purpose of expelling from the container a fluid, either a liquid or a gas.

As many changes could be made in the above device and many apparently widely different embodiments of this invention could be made without departing from the scope of the claims, it is intended that all matter contained in the above description or shown in the accompanying drawings shall be interpreted as illustrative and not in a limiting sense.

Having thus described our invention what we claim as new and desire to secure by Letters Patent of the United States is:

1. A pressure accumulator comprising a container having an opening therein, a collapsible and expansible rubber bag in said container having an inlet thereto, an annular flange around the opening in said container defining a shoulder, a tubular member in said opening having an external peripheral flange, a serrated rim extending above said external peripheral flange, and an internal peripheral flange, a snap ring encompassing said tubular member beneath said external peripheral flange and seated on said annular flange against said shoulder, a nut affixed to said tubular member and clamping the latter to said annular flange, a gasket encompassing said tubular member between said nut and said snap ring to provide a seal therebetween, a cup shaped member displaceably mounted with respect to said serrated rim and having an inner diameter greater than the diameter of said rim, a bolt rigid with said cup shaped member at the center thereof and affixed to said rubber bag, a coil spring encompassing said bolt, seated on the upper face of said internal peripheral flange and urged against the underside of said cup shaped member, a disc having a hub and a plurality of openings therethrough, the lower end of said bolt extending through said hub, a nut affixed to said bolt beneath said disc, and a coupling member in said tubular member clamping said disc against the bottom face of said internal peripheral flange.

2. A pressure accumulator comprising a container having an opening therein, a collapsible and expansible rubber bag in said container having an inlet thereto, a tubular member affixed in said opening and having a serrated inner end extending into said container, a cup shaped valve member in said container displaceably mounted with respect to the serrated inner end of said tubular member and having an inner diameter greater than the diameter of the inner end of said tubular member so that it may encompass the latter, a seat for said valve member in said container between the serrated inner end of said tubular member and said opening and means normally to retain said valve member spaced from said seat to permit flow of fluid through the serrated inner end of said tubular member.

3. A pressure accumulator comprising a container having an opening therein, a collapsible and expansible rubber bag in said container having an inlet thereto, a tubular member affixed in said opening having an external annular lateral flange defining a valve seat in said container, said member having an annular serrated inner end outstanding from said flange at right angles thereto, a cup shaped valve member displaceably mounted with respect to said serrated inner end and having an inner diameter greater than the outer diameter of said serrated end to encompass the latter and means to retain the valve member spaced from said seat to permit flow of fluid through the serrated inner end of said tubular member.

4. The combination set forth in claim 3 in which said bag is affixed to said displaceable valve member.

ISAAC E. WEBER.
JOSEPH BLUMENFELD.

REFERENCES CITED

The following references are of record in the file of this patent:

UNITED STATES PATENTS

| Number | Name | Date |
| --- | --- | --- |
| 2,256,835 | Mercier | Sept. 23, 1941 |
| 2,331,921 | Mercier | Oct. 19, 1943 |
| 2,342,356 | Mercier | Feb. 22, 1944 |
| 2,385,016 | Mercier | Sept. 18, 1945 |
| 2,387,598 | Mercier | Oct. 23, 1945 |
| 2,389,791 | Lippincott | Nov. 27, 1945 |
| 2,390,319 | Overbeke | Dec. 4, 1945 |
| 2,399,444 | Mercier | Apr. 30, 1946 |
| 2,401,791 | Overbeke | June 11, 1946 |
| 2,401,792 | Overbeke | June 11, 1946 |